(12) United States Patent
Geka et al.

(10) Patent No.: US 9,194,428 B2
(45) Date of Patent: Nov. 24, 2015

(54) LINEAR MOTION GUIDE UNIT WITH SEPARATORS INTERPOSED BETWEEN ADJOINING ROLLING ELEMENTS

(71) Applicant: NIPPON THOMPSON CO., LTD., Tokyo (JP)

(72) Inventors: Toshiaki Geka, Tokyo (JP); Takaaki Tsuboi, Tokyo (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/552,821

(22) Filed: Nov. 25, 2014

(65) Prior Publication Data

US 2015/0159695 A1 Jun. 11, 2015

(30) Foreign Application Priority Data

Dec. 6, 2013 (JP) .................................. 2013-252801

(51) Int. Cl.
*F16C 29/06* (2006.01)
*F16C 33/37* (2006.01)

(52) U.S. Cl.
CPC ......... *F16C 33/3706* (2013.01); *F16C 29/0666* (2013.01)

(58) Field of Classification Search
CPC . F16C 29/065; F16C 29/0666; F16C 33/3706
USPC .............................................. 384/43, 44, 522
See application file for complete search history.

(56) References Cited

U.S. PATENT DOCUMENTS

| 6,419,069 B1 * | 7/2002 | Teramachi .................. 193/35 R |
| 2008/0317391 A1 * | 12/2008 | Chen et al. ...................... 384/44 |

FOREIGN PATENT DOCUMENTS

| JP | 11351254 A | * | 12/1999 |
| JP | 3219170 B2 | | 10/2001 |
| JP | 2011112069 A | | 6/2011 |
| JP | 2012026534 A | * | 2/2012 |

* cited by examiner

*Primary Examiner* — Phillip A Johnson
(74) *Attorney, Agent, or Firm* — Browdy and Neimark, P.L.L.C.

(57) ABSTRACT

More than two roller rows are arranged on only a closed or looped circuit. A separator is arranged on one roller row out of phase relative to a separator on the other roller row, thereby making less any variation in posture of the slider, which would otherwise occur when the rollers transfer from or into the load-carrying race, and vice versa, eventually improving any travelling accuracy of the slider. The separator interposed between the adjoining rollers lying in the adjoining roller rows is composed of an isolation wall coming into sliding contact with the end surfaces of the rollers lying side by side in the roller rows juxtaposed with each other, a pair of first separator wing extending sidewise from one side of the isolation wall to embrace the circular rolling surface of the roller in one roller row from both sides thereof, and a second separator wing extending from another side of the isolation wall on the opposite side of the first separator wing to lie between circular rolling surfaces of two adjacent rollers in another roller row.

11 Claims, 13 Drawing Sheets

LINEAR MOTION GUIDE UNIT WITH SEPARATORS INTERPOSED BETWEEN ADJOINING ROLLING ELEMENTS

FIELD OF THE INVENTION

The present invention relates generally to a linear motion guide unit adapted for use between any two parts allowed to slide relative to each other in machinery such as various assembling machines, machine tools, industrial robots, semiconductor fabricating machines, or the like and, more particularly, to a linear motion guide unit in which separators are each interposed between any adjoining rolling elements.

BACKGROUND OF THE INVENTION

There is conventionally known a linear motion guide bearing of a linear motion guide unit in which more than one row of rolling elements is disposed in only one load-carrying race. For instance, Japanese Patent No. 3 219 170 discloses a linear motion guide bearing in which rolling elements are arranged in a plural rows in a common or single load-carrying race for a purpose of keeping occurrence of any skew and/or tiny or minute vibration under control. With the linear motion guide bearing constructed as stated just earlier, bearing recesses of bearing body have races along which rollers circulate in two rows to allow a shaft and the bearing body to make linear motion each other. The rollers lying in two rows are arranged to be out of each other every row by a radius of the roller to allow the rollers to move independently each other.

Moreover, another motion guide device has been known in which no skew occurs even with any inclination error or lopsided load on the mounting surface. For instance, Japanese Laid-Open Patent Application No. 2011-112 069 discloses a linear motion guide device of roller type in which the rollers are disposed in a plurality of recirculation circuits and held by means of retainers made of synthetic resin. The prior linear motion guide unit is composed of a track member, a moving member having a plurality of load-roller rolling surfaces facing a plurality of roller rolling surfaces, a plurality of non-load return passages extending in parallel with the plurality of load-roller rolling surfaces and a plurality of turnaround passages connecting the load-roller rolling surfaces with the non-load return passages to form a plurality of roller recirculation circuits through which the rollers are allowed to roll in an endless manner. Of the plurality of roller recirculation circuits, at least one roller recirculation circuit has a plurality of rollers lying in more than two rows. Upon movement of the moving member relative to the track member in the lengthwise direction of the track member, the rollers lying in more than two rows roll through between the roller rolling surfaces on the track member and the load-roller rolling surfaces on the moving member to move along the roller recirculation circuits.

Meanwhile, the first prior linear motion guide bearing cited above has a problem in which the rollers would suffer frictional resistance that is encountered while the rollers adjoining in tandem axially of them turn on their axes with their axial ends sliding over each other. The second prior linear motion guide device, moreover, has a serious issue that the retainer to hold the more than two rows of rollers would become inevitably sophisticated in construction and a large scale in the overall construction as well as needs several more chores for the production thereof.

SUMMARY OF THE INVENTION

The present invention, therefore, has as its primary object to overcome the problems as stated earlier and especially to provide a linear motion guide unit in which more than two roller rows or N roller rows are arranged for one recirculation circuit, a pitch or distance between successive rollers in every roller row being out of phase or phase difference by 1/N pitch relative to other pitches between rollers in other roller rows, and a separator is provided to isolate the successive rollers from each other and further separate the roller rows away from each other. More especially, the separator is composed of an isolation wall lying between any two adjacent roller rows, and first and second separator wings extending sidewise from the isolation wall in opposite directions to separate any two adjoining rollers from each other. With the construction as stated earlier, the separator serves to guide lead the rollers in every roller row with keeping constantly and certainly out-of-phase or phase difference in the pitch between successive rollers in every roller row with respect to the pitch in the adjacent roller row, thereby making less any variation in posture of the slider, which would otherwise occur when the rollers transfer from the turnaround passage into the load-carrying race, and vice versa, and eventually improving any travelling accuracy of the slider.

The present invention is concerned with a linear motion guide unit comprising; an elongated guide rail having a first raceway surface extending lengthwise on each side of the guide rail, and a slider having a second raceway surface extending in opposition to the first raceway surface on the guide rail to define a load-carrying race between the first raceway surface and the second raceway surface, the slider that fits over or conforms to the elongated rail for movement in a sliding manner relative to the guide rail through a roller rolling through the load-carrying race, and the slider including a carriage having a return passage extending in parallel with the second raceway surface, and end caps secured on lengthwise opposite ends of the carriage and provided with turnaround passages to communicate the load-carrying race with the return passage to provide only a closed or looped circuit;

wherein a plurality of roller rows are arranged on the closed or looped circuit and a separator is interposed between any two rollers to roll together with the rollers through the closed or looped circuit which is made up of the load-carrying race, the return passage and the turnaround passages; and wherein the separator is composed of an isolation wall lying between any two adjacent roller rows to come into sliding contact with axially opposite ends of the rollers juxtaposed each other in the two adjacent roller rows to guide or lead the rollers, a pair of first separator wing extending from the isolation wall in a sidewise direction to embrace on both sides a circular rolling surface of the roller in one row of the two adjacent roller rows, and a second separator wing extending from the isolation wall in a sidewise direction opposite to the sidewise direction to lie between circular rolling surfaces of the rollers in another row of the two adjacent roller rows.

In the present invention, a linear motion guide unit is disclosed in which the plurality of roller rows is N rows, in which N is a number more than two, and the rollers in the adjacent roller rows roll in a lengthwise direction of the roller row with keeping out of phase or phase difference by 1/N pitch relative to each other. As an alternative, the plurality of roller rows is two rows, and the separators are alternately bilaterally turned over and arranged between the roller rows along a traveling direction of the rollers. Moreover, when the plurality of roller rows is three rows, the separators are arranged such that the first separator wings are each interposed between the adjoining rollers rolling through the roller row lying at either side of the three roller rows and the second separator wings are each interposed between the adjoining rollers rolling through a middle row of the three roller rows.

In the present invention, a linear motion guide unit is disclosed in which the pair of first separator wings has inward curved surfaces opposing each other to embrace the circular rolling surface of the roller and second separator on both sides thereof has inward curved surfaces each of which comes into contact with the circular rolling surface of the roller. Moreover, the separator has an inner surface of flat contour in conformity with an inner surface of the turnaround passage in the closed or looped circuit, and an outer surface of curved contour in conformity with an outer surface of the turnaround passage in the closed or looped circuit.

In the present invention, a linear motion guide unit in which the first separator wing and the second separator wing at their free ends have flanges to embrace the circular rolling surface of the roller to serve for keeping the roller against falling away from the slider while rolling through the load-carrying race.

In the present invention, the first separator wing and the second separator wing at their ends have a first projection and a second projection respectively, each of which fit in a guide groove cut in the closed or looped circuit. Moreover, a retainer plate fits in a recess cut in the carriage midway between an upside load-carrying race and a downside load-carrying race and further the first projection of the first separator wing and the second projection of the second separator wing are held for movement with a first extensions, a second extensions and a third extensions in cooperation with the carriage. The first projection and the second projection to lead the separator along the closed or looped circuit are beveled or rounded at edge to have a curved configuration.

In the present invention, the separator has grooves, caves or recesses serving oil reservoirs or sumps, which are formed on surfaces coming into contact or engagement with the circular rolling surface and/or axially opposite ends of the roller.

Advantageous Effects of the Invention

With the linear motion guide unit constructed as stated earlier, as more than two roller rows are arranged on only a closed or looped circuit, it will be expected to increase the number of roller rows subjected to the load, thereby making less a load variation on the overall number of roller rows to render the posture variation of the slider less. As a result, the slider is kept against swaying while moving back and forth and therefore improved in travelling accuracy. More especially, because of the separator that straddles across more than two roller rows while lying between adjoining rollers in every roller row, the rollers juxtaposed in adjacent roller rows are allowed to roll or move with keeping phase deference or out of phase relative to each other. As a result of the roller rows arranged as described earlier, the rollers in every roller rows are prevented from ingress into and/or egress out of the load-carrying race at the same time. Thus, the load variation on the overall number of roller rows is suppressed less whereby the posture variation of the slider is kept less and therefore the slider is kept against swaying while moving to improve in travelling accuracy.

With the conventional linear motion guide unit, whenever the rollers get in and/or get off the load zone in the load-carrying race in the closed or looped circuit, the rollers and the load-carrying race are suffered to elastic deformation. As a result, the number of the roller rows existing on the load-carrying race changes periodically to cause an up and down posture variation of the slider relative to the guide rail and further the slider is suffered the moment load to cause the posture variations in three directions including pitching. In contrast, the linear motion guide unit constructed according to the present invention makes it possible to solve the problems as stated earlier. Moreover, the separator of the present invention is simple in construction, easy for fabrication and less in production cost. With the linear motion guide unit, moreover, only one sort of separator is universal for various length of slider if the separator and the rollers are adjusted in number. With the linear motion guide unit of the present invention, the separator is guided or led using the groove provided the closed or looped circuit including the turnaround passages to make sure of smooth movement of the separator together the rollers, and eventually improving the back-and-forth movement of the slider along the guide track, compared with the construction in which the rollers are arranged staggered each other.

DETAILED DESCRIPTION OF THE PREFERRED EMBODIMENTS

The linear motion guide unit of the present invention is expected for the application to the swiveling part in diverse machines including semiconductor manufacturing machines, precision instruments, measurement/inspection, various assembling machines, conveying machines, machine tools, micromachines, and so on. Hereinafter will be described a preferred embodiment of a linear motion guide unit in which a separator constructed according to the present invention is installed between the rollers.

Figure 1:
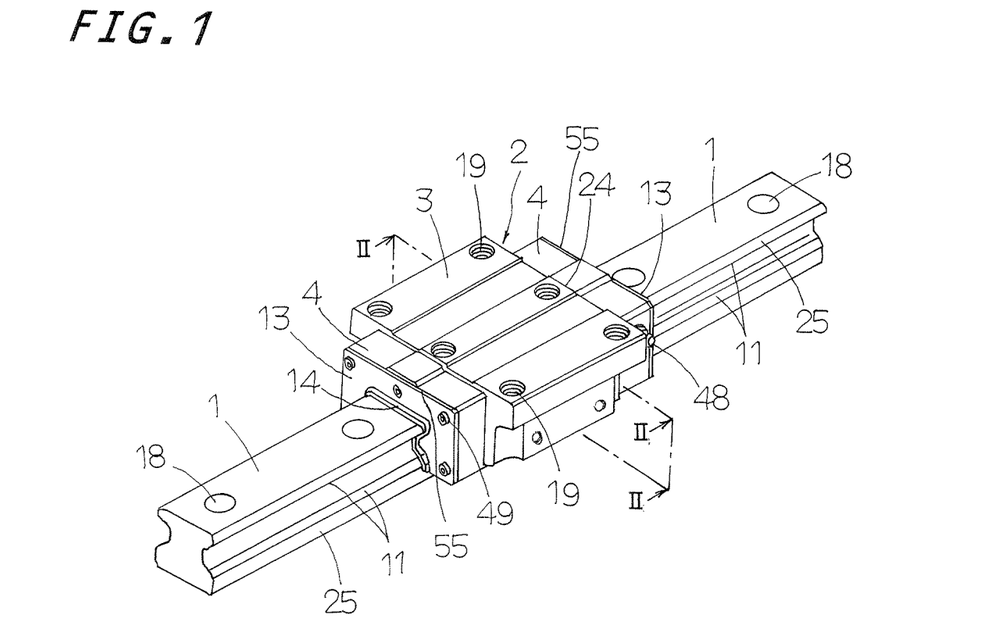
FIG. 1 is a perspective view showing a preferred embodiment of a linear motion guide unit, in which a separator constructed according to the present invention is disposed therein.
Figure 2:
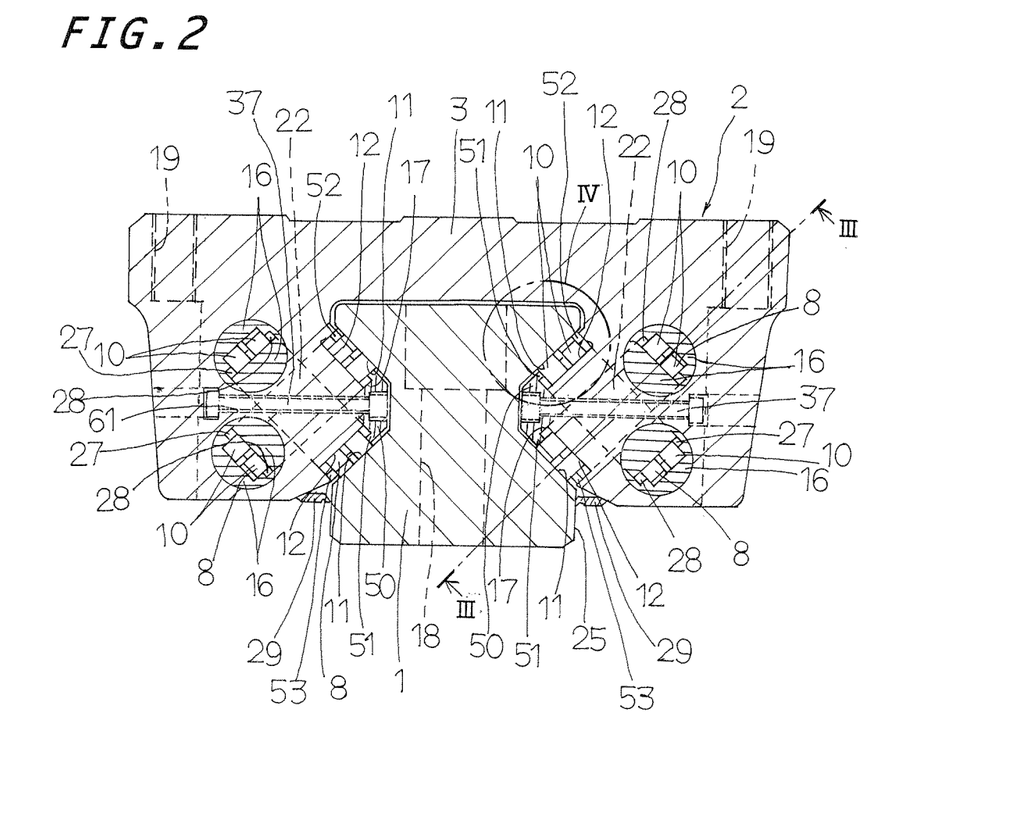
FIG. 2 is a traverse cross-sectional view of the linear motion guide unit shown in FIG. 1 and taken on the plane of the line II-II of that figure to illustrate two rows of rollers lying on a single recirculation circuit.
Figure 3:
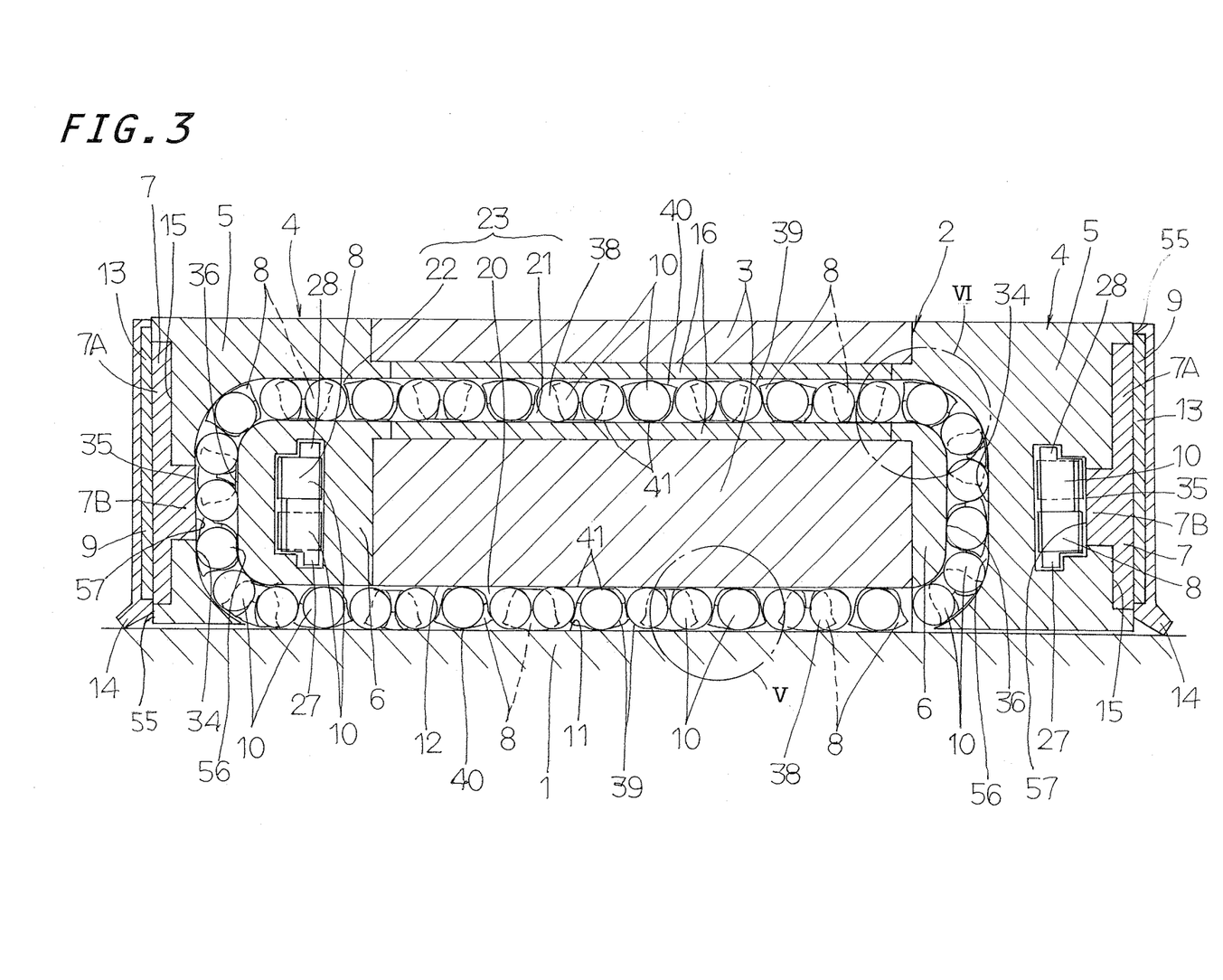
FIG. 3 is a longitudinal section explanatory of a recirculation circuit in the linear motion guide unit, the view being taken on the plane of the line III-III of FIG. 2.

The linear motion guide unit of the present invention, as shown in FIGS. 1 to 3, is in general comprised of an elongated guide rail 1, and a slider 2 that fits over and conforms to the guide rail 1 for sliding movement through rolling elements of rollers 10. The guide rail 1 has lengthwise sides 25, each of which has a pair of longitudinal raceway surfaces or first races 11. The guide rail 1, moreover, has holes 18 extending vertically from a top surface to a bottom surface of the guide rail 1, which are used to fasten the guide rail 1 to a stationary member including machine bed and other machinery. Moreover, the linear motion guide unit features separators 8 interposed between any adjoining rollers 10 to ensure that the rollers 10 are allowed to roll through recirculation circuits 23 with suffering no interference with each other. More especially, the elongated guide rail 1 has two rows of the first raceway surfaces 11 extending lengthwise on each side of the guide rail 1 and the slider 2 has two rows of the second raceway surfaces 12 extending lengthwise on each side of the slider 2, so that four load-carrying races 20 in all are defined between the first raceway surfaces 11 on the guide rail 1 and the second raceway surfaces 12 on each side of the slider 2. The linear motion guide unit constructed as stated earlier is preferably applicable to the large-scale type having the guide rail 1 of around 55 mm in width.

The slider 2 is of flange type and mainly comprised of a carriage 3 having a pair of return passages 21 extending in parallel with pairs of load-carrying races 20 each of which is defined between raceway surfaces 11 and 12, end caps 4 mounted on forward and aft end surfaces 24 of the carriage 3, one to each end, and end seals 13 attached on outward end surfaces 24 of the end caps 4. The carriage 3 is also made with threaded holes 19, which are used to fasten the slider 2 to counterparts, not shown, including various equipment, works and the like. The end caps 4 are each provided with turnaround passages 22 curved to communicate the load-carrying races 20 with the return passages 21. The end seals 13 are each provided with a lip 14 opposing to the surface of the guide rail 1 and backed up overall save the lip 14 with a metallic core 9. The slider 2 has the separators 8 and the rollers 10 which are allowed to roll through the recirculation circuit 23, which is composed of the load-carrying race 20, the return passage 21 and the pair of turnaround passages 22. A lubricating member 7 impregnated with lubricant is installed in a recess 15 of each end cap 4 to lubricate the rollers 10 while rolling through end cap 4. The roller 10 is made in a substantially cylindrical contour which has a circular rolling surface 39 lying on line contact with the recirculation circuit 23, and end surfaces 38 lying axially opposite across the circular rolling surface 39. The end caps 4 and the end seals 13 are secured together to the carriage 3 with using fastening bolts 49. The return passage 21 in the carriage 3 is formed within a through-hole within a sleeve 16 installed in a lengthwise bore 60 in the carriage 3. The sleeve 16 makes abutment end to end with a spigot 54, which is raised above an end surface of the end cap 4, thereby making smooth connection with no gap between the turnaround passage 22 and the return passage 21.

The end cap 4 is composed of an end cap major part 5 having a concavity 56 open face-to-face the carriage 3 to define an outside curved half surface 34 of the turnaround passage 22, and a spacer part 6 nested inside the concavity 56 to define an inside curved half surface 36 of the turnaround passage 22. After the spacer part 6 is nested inside the concavity 56 in the cap major part 5 to complete the end cap 4, the outside curved half surface 34 in the end cap major part 5 comes into opposition and alignment with the inside curved half surface 36 in the spacer part 6 to complete the turnaround passage 22. With the end cap major part 5, moreover, a recess 15 to receive therein a lubricating member 7 is formed on an outward end surface 55 lying opposite to the carriage 3. The lubricating member 7 is made of, for example, finely powdery ultrahigh molecular weight synthetic resin, which is first subjected to compacting and the resulting compact is subsequently sintered at elevated temperature to provide a porous compact having open-porous or open-cellular texture whose pores or cells preserved among fine particles are open each other through interstices or channels. The lubricating members 7 has a lubricant reservoir plate 7A and an applicator nose 7B made integral with the lubricant reservoir plate 7A and extended through an opening 35 to be exposed to the turnaround passage 22. The applicator nose 7B is designed to have an edge 57 adapted to expose itself to the turnaround passage 22. Moreover, the slider 2 has bottom seals 29 to close clearances left between a lower surface of the slider 2 and each side of the guide rail 1. The end cap 4 has a threaded opening 35 into which a grease nipple 48 fits to feed lubricant into the slider 2. The rollers 10 roll through the load-carrying race 20 while suffered with the load and then through the return passage 21 and turnaround passages 22 while suffering no load. The separators 8 also roll through the recirculation circuit 23 together with the rollers 10 with interposed between the adjoining rollers 10. The rollers 10 and the separators 8 are held with retainer plate 50 while rolling through the load-carrying race 20. The retainer plate 50 fits into a lengthwise recess 17 cut in the carriage 3 and is fastened to the carriage 3 by means of bolts 37 which extends through a bore 61.

The linear motion guide unit of the present invention, especially, features that more than two or N rows of rollers 10 are arranged in one recirculation circuit 23 and the separators 8 are interposed between not only any two adjoining rollers 10 but any adjacent roller rows. With the embodiment shown in FIGS. 2 to 4, two roller rows or N roller rows of the rollers 10 are arranged for one recirculation circuit 23 and a pitch or distance between successive rollers 10 in every roller row is out of phase or phase difference by 1/N pitch relative to other pitches between rollers 10 in other roller rows. With the embodiment in which the two roller rows are arranged on the single recirculation circuit 23, the rollers 10 roll or move in lengthwise direction of the recirculation circuit 23, with keeping such relation that the pitch or distance between any two adjacent rollers 10 in any one roller row is out of phase or phase difference by ½ pitch relative to other pitch between the rollers 10 in another roller row. With the linear motion guide unit constructed as stated earlier, the separator 8 is disposed to interpose between any two rollers in any one roller row and straddle across the adjacent two roller rows. The separator 8 is to securely guide or lead the rollers 10 with keeping the phase difference in pitch between the successive rollers 10 to thereby make less any variation in posture of the slider, which would otherwise occur when the rollers transfer from the turnaround passage into the load-carrying race, and vice versa, and eventually improving any travelling accuracy of the slider. Moreover, the retainer plate 50 has a rectangular window 58 extending lengthwise on each side of the retainer plate 50 to stow the rollers 10 and the separators 8 while they roll on the load-carrying race 12. The rectangular window 58 is partly restricted with first, second and third aprons or extensions 51, 52 and 53 overhanging a little above the load-carrying race 12 to provide grooves 59 to guide projections 27, 28 of the separator 8. As an alternative, the first, second and third extensions 51, 52 and 53 may be prepared separately and then secured to the retainer plate 50.

Figure 9:
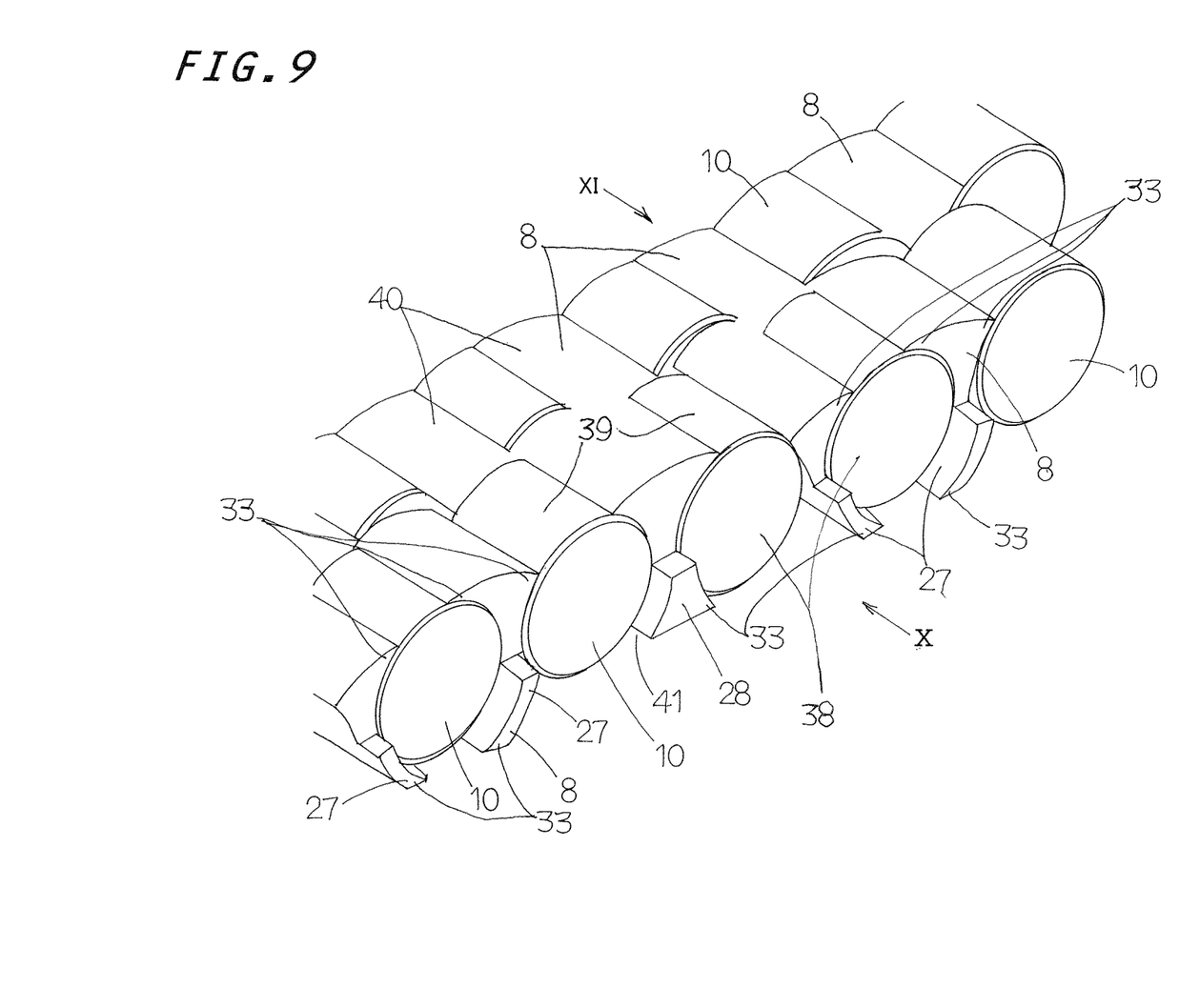
FIG. 9 is a view in perspective showing separators assembled with the rollers in the linear motion guide unit of FIG. 1.
Figure 10:
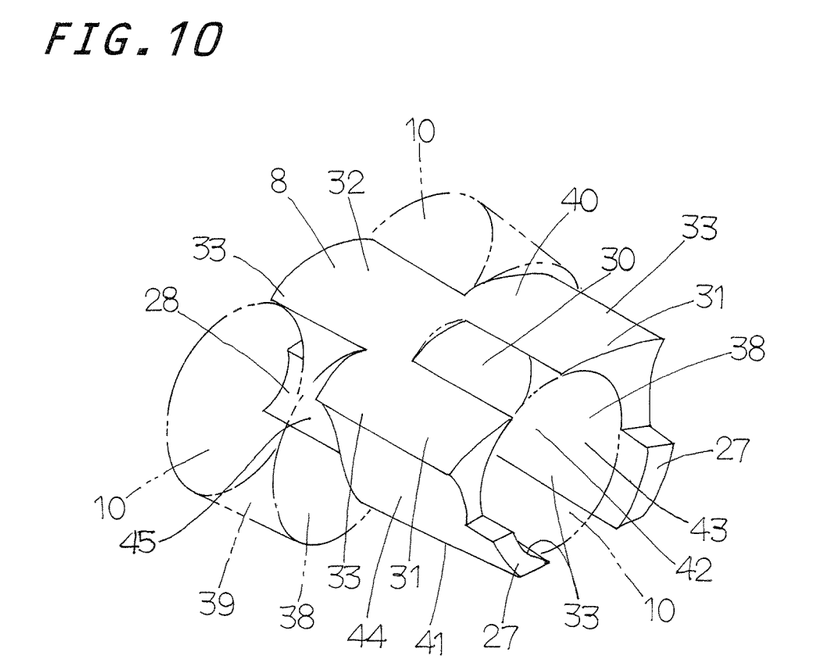
FIG. 10 is a view in perspective showing the separator combined with the rollers, the separator being viewed from a pair of first separator wings in a direction of sign X in FIG. 9.
Figure 11:
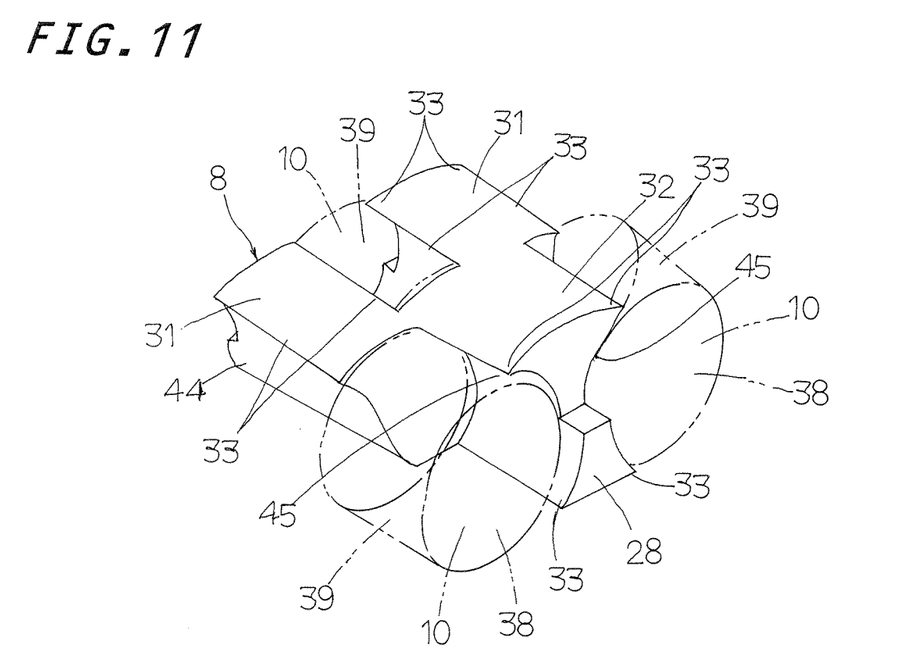
FIG. 11 is a view in perspective showing the separator combined with the rollers, the separator being viewed from a second separator wings in a direction of sign X I in FIG. 9.
Figure 12:
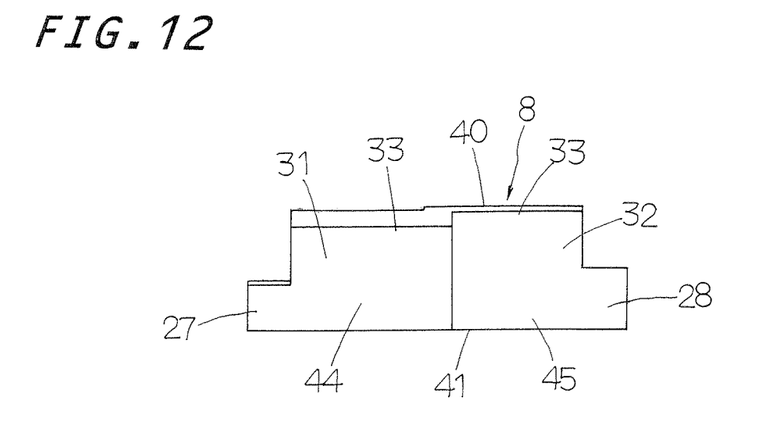
FIG. 12 is a view in front elevation of the separator when view in a traveling direction of the roller in the recirculation circuit of FIG. 3.
Figure 13:
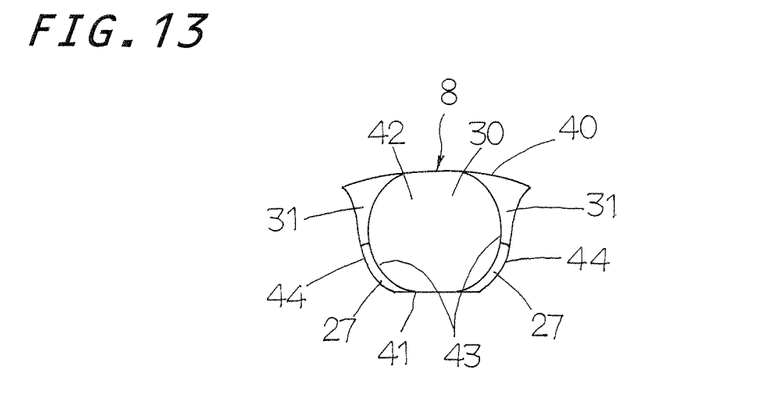
FIG. 13 is a view in leftward side elevation showing the separator of FIG. 12.
Figure 14:
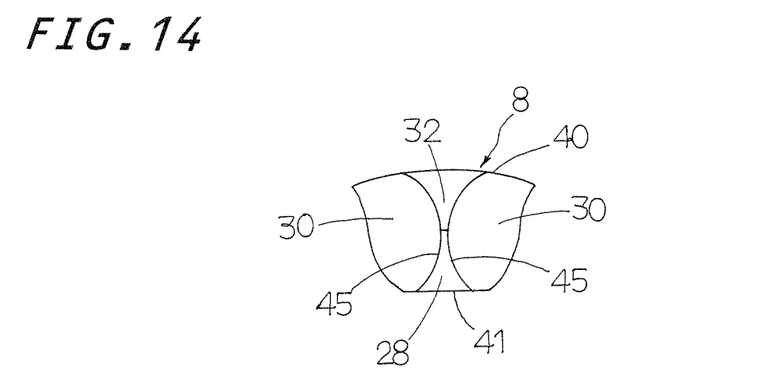
FIG. 14 is a view in rightward side elevation showing the separator of FIG. 12.
Figure 15:
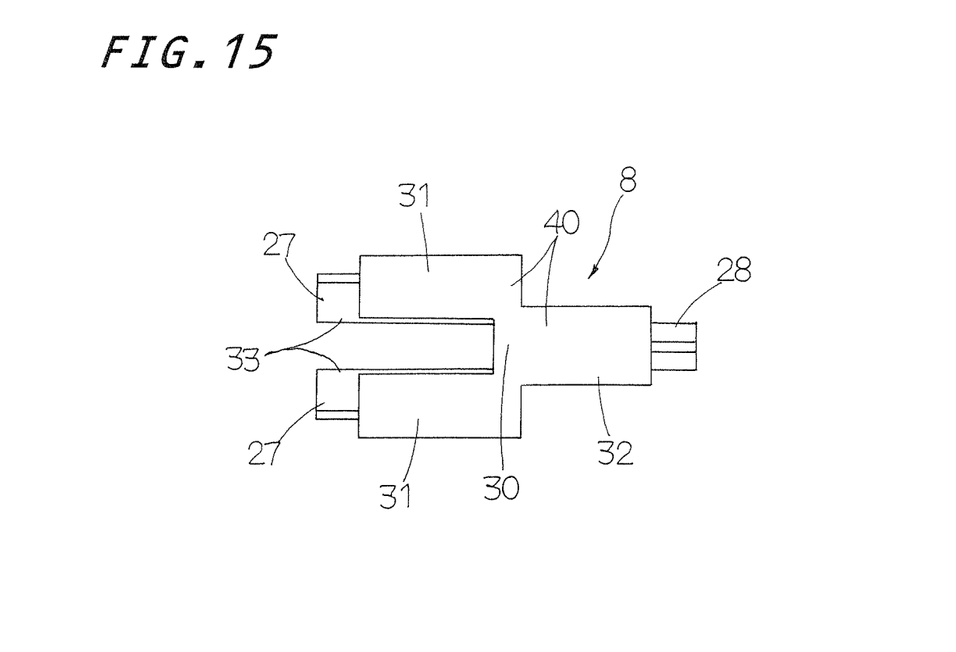
FIG. 15 is a view in top plan showing the separator of FIG. 12.
Figure 16:
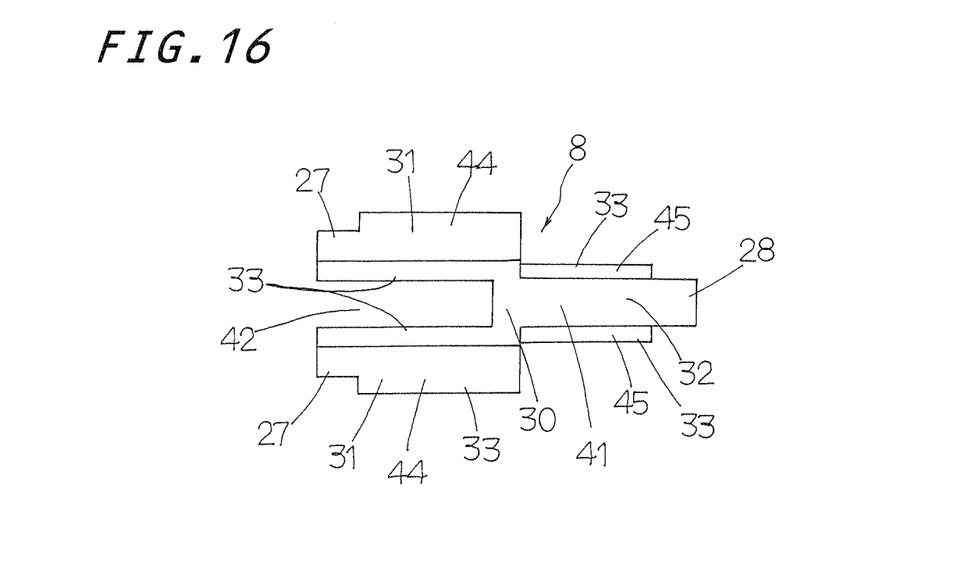
FIG. 16 is a view in bottom plan showing the separator of FIG. 12.
Figure 17:
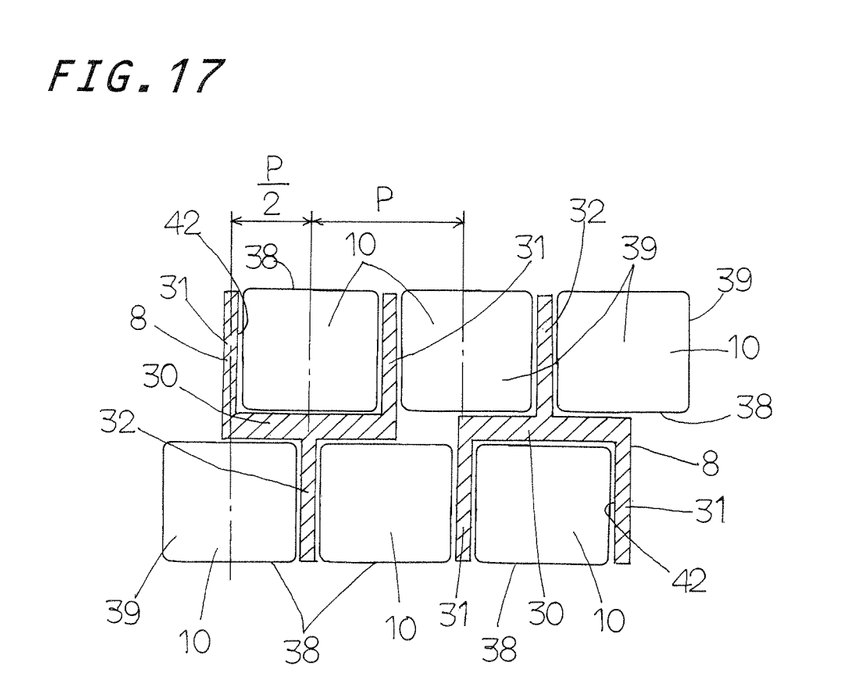
FIG. 17 is a schematic view of the separators arranged for the two roller rows installed in one recirculation circuit of the linear motion guide unit.

Referring to FIGS. 9 to 16, there is shown the separator 8 in detail. The separator 8 is composed of an isolation wall 30 coming into sliding contact with the end surfaces 38 of the rollers 10 lying side by side in the roller rows juxtaposed with each other, a first separator wing 31 extending sidewise from one side of the isolation wall 30, the first separator wing including a pair of guard members embracing the circular rolling surfaces 39 of the roller 10 in one roller row from both sides thereof, and a second separator wing 32 extending from another side of the isolation wall 30 on the opposite side of the first separator wing 31 at a location out of phase by P/2 with the first separator wing 31 so as to lie between circular rolling surfaces of two adjacent rollers in another roller row. The separator 8 as shown schematically in FIG. 17 straddles across the adjacent roller rows to allow every roller to roll with causing no interference with each other. More especially, the separator 8 is made up of the isolation wall 30 lying between the juxtaposed roller rows to separate the juxtaposed roller rows from each other to guide the circular end surfaces 38 of the rollers 10 in the juxtaposed roller rows independently from each other, the pair of guard members of the first separator wing 31 extending sidewise from one side of the isolation wall 30, and the second separator wing 32 extending from another side of the isolation wall 30 on the opposite side of the first separator wing 31. The isolation wall 30, the first separator wing 31 of the pair of guard members and the second separator wing 32 are made integral with each other. The pair of guard members of the first separator wing 31 has inward curved or concave surfaces 43 opposing each other and outward curved or convex surfaces 44. The second separator wing 32 on both sides thereof has inward curved surfaces 45. The inward curved surface 43 on the first separator wing 31 and the inward curved surface 45 are designed to come into rolling contact with circular rolling surface 39 of the roller 10. With the separator 8 constructed for the two roller rows as shown in FIG. 9, the separators 8 and the bilaterally turned-over one are arranged alternately in series along the two roller rows. More especially, the first separator wing 31 and the second separator wing 32 are arranged alternately on one of the two roller rows and, correspondingly, the second separator wing 32 and the first separator wing 31 are arranged alternately on another of the two roller rows. The pair of the first separator wings 31 has the inward curved surfaces 43 opposing each other to form a roller accommodation 42, and the outward curved surfaces 44. The inward curved surfaces 43 are intended to embrace or hold each one of the rollers 10 between them. The second separator wing 32 on both sides thereof has inward curved surfaces 45, which come into rolling contact with the circular rolling surfaces 39 of the rollers 10 lying juxtaposed in the rolling direction to hold the roller 10 between the adjacent second separator wings 32.

The separator 8 flanked with the rollers 10 is envisaged to roll smoothly through the recirculation circuit 23 made up of the load-carrying race 20, the return passage 21 and the pair of turnaround passages 22. To this end, the separator 8 on an outer surface 40 (upper surface in FIG. 9) thereof is made curved or arced to make sure of the smooth traveling throughout an overall outer looped surface of the recirculation circuit 23 including outer curved surfaces 34 of the turnaround passages 22, an outer surface of the return passage 21 and the load-carrying surface 11 on the guide rail 1. Especially, the outer surface 40 of the separator 8 is formed curved configuration less in radius of curvature than the outer curved surface 34 to keep the roller 8 from getting any interference with the turnaround passages 22. Moreover, an inner surface 41 of the separator 8 is made flat surface in conformity with an overall inner looped surface of the recirculation circuit 23 including inner curved surfaces of the turnaround passages 22, an inner surface of the return passage 21 and an inner surface (the lower surface in FIG. 9) in the carriage 3 lying in opposition to the load-carrying surface 11. With the linear motion guide unit constructed as stated earlier, the first separator wing 31 and the second separator wing 32 at their free ends have flanges 33 lying in opposition each other to embrace the circular rolling surface 39 of the roller 10 to serve for keeping the roller 10 against falling away from the slider 2 while rolling through the load-carrying race 20.

Figure 4:
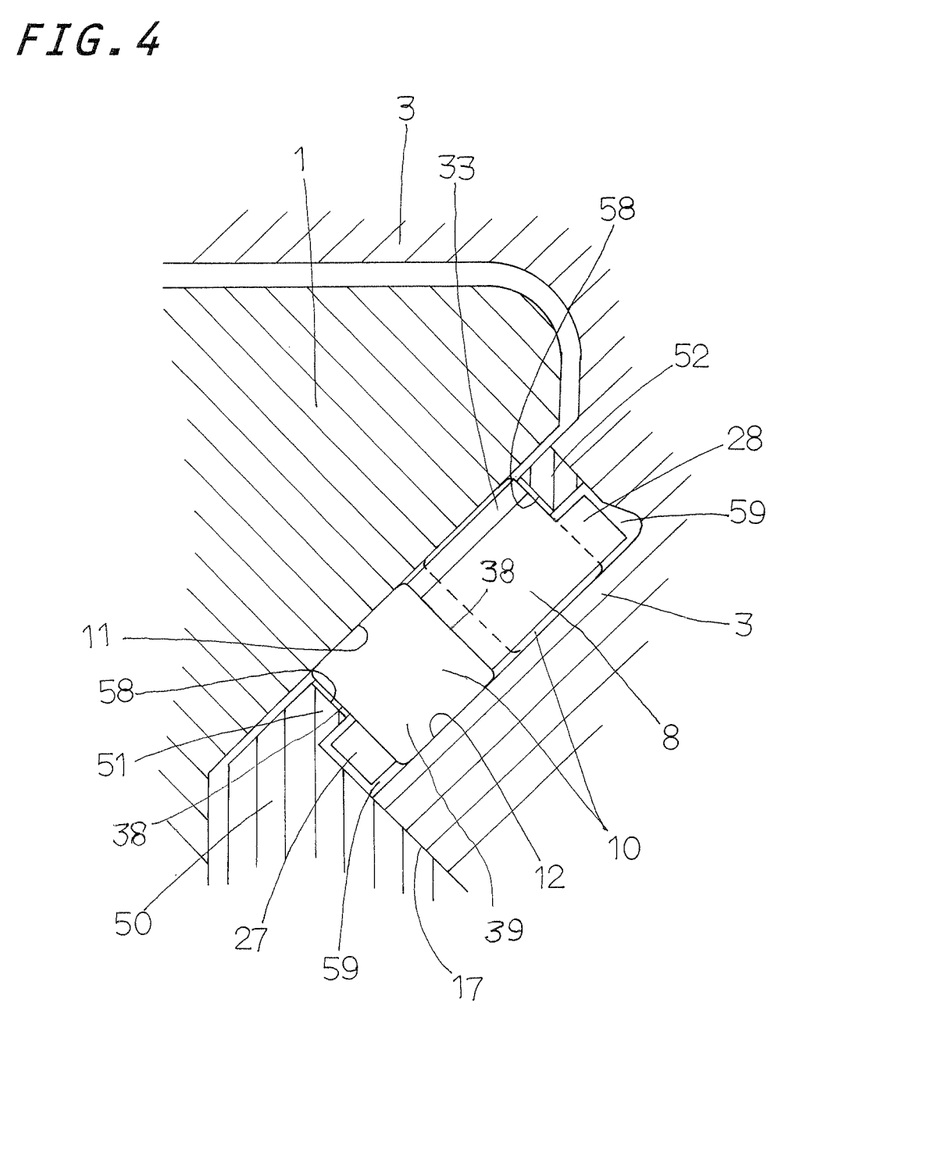
FIG. 4 is an enlarged fragmentary view in section showing an encircled area IV in the linear motion guide unit of FIG. 2.
Figure 8:
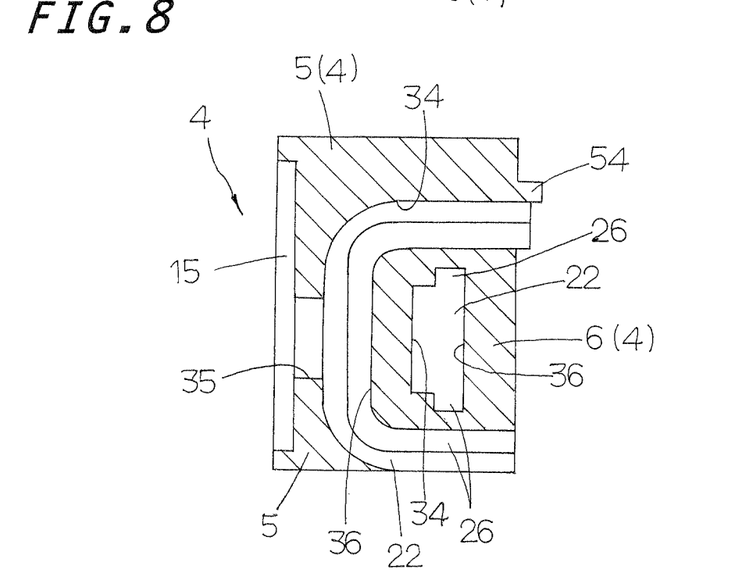
FIG. 8 is a view in longitudinal section showing a turnaround passage in the end cap lying at the leftward end in FIG. 3.

With the linear motion guide unit of the present invention, moreover, the first separator wing 31 and the second separator wing 32 at their ends have a first projection 27 and a second projection 28 respectively. The end cap 4 as shown in FIG. 8 has a guide groove 26 extending along the inner curved surface of the turnaround passage 22. The first projection 27 and second projection 28 are provided to lead securely the separator 8 along the recirculation circuit 23, more especially, along the guide groove 26 cut in the turnaround passage in the end cap 4 and a groove 59, shown in FIG. 4, defined with the retainer plate 50 and the load-carrying race 12 on the carriage 3. With the linear motion guide unit shown in FIG. 2, the retainer plate 50 fits into the lengthwise recess 17 cut in the carriage 3 midway between the upside load-carrying race 20 and the downside load-carrying race 20 to define, in combination with the carriage 3, the grooves 59 to lead or guide the first projection 27 and the second projection 28 of the separator 8. More especially as shown in FIG. 4, while the first projection 27 is guided or led along the groove 59 defined the first extensions 51 and the load-carrying race 12 on the carriage 3, the second projection 28 is guided along the groove 59 defined the second extensions 52 and the load-carrying race 12 on the carriage 3 and further guided along the groove 59 defined the third extensions 53 and the load-carrying race 12 on the carriage 3. Moreover, the first projection 27 and the second projection 28 to lead the separator 8 along the recirculation circuit 23 are beveled or rounded at edge 62 to have a curved configuration.

Figure 5:
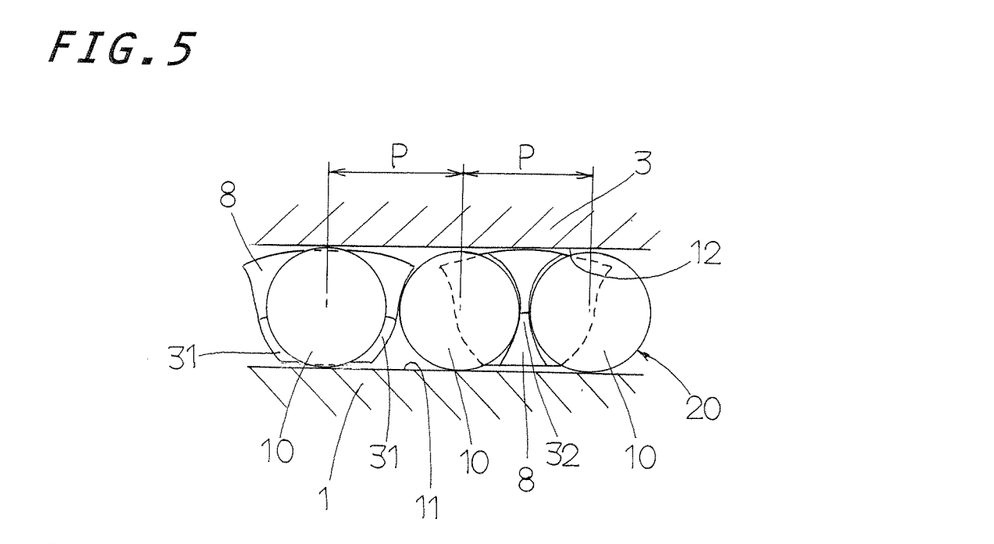
FIG. 5 is an enlarged fragmentary view in section showing an encircled area V in the linear motion guide unit of FIG. 3.
Figure 6:
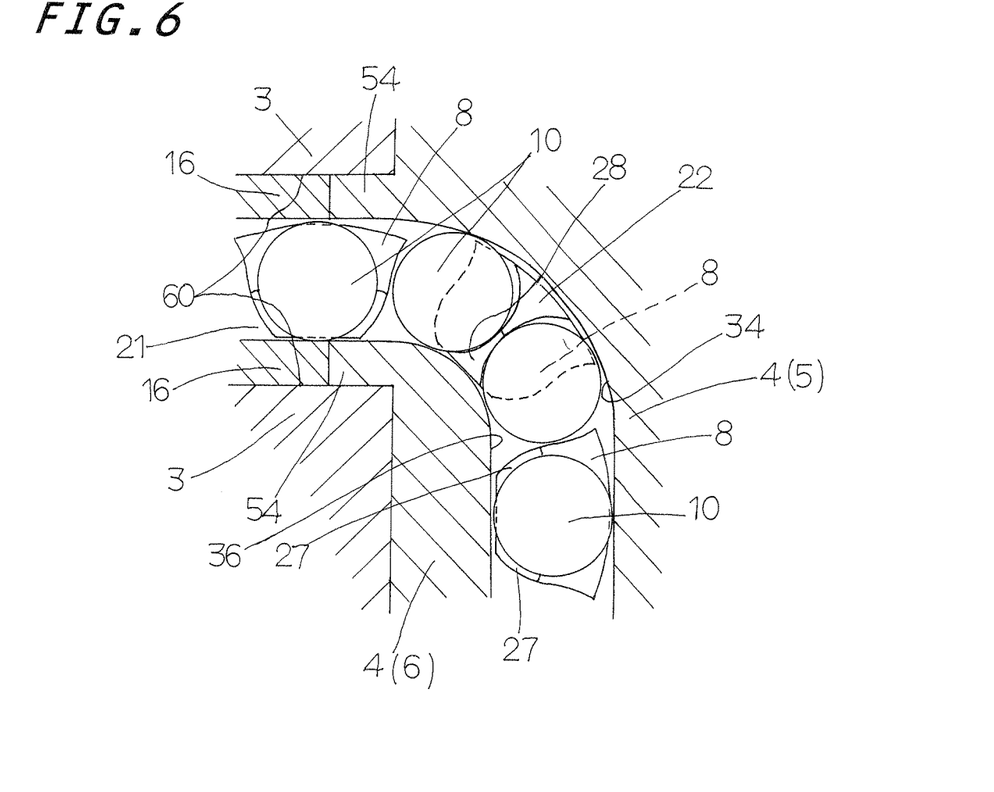
FIG. 6 is an enlarged fragmentary view in section showing an encircled area • in the linear motion guide unit of FIG. 3.
Figure 7:
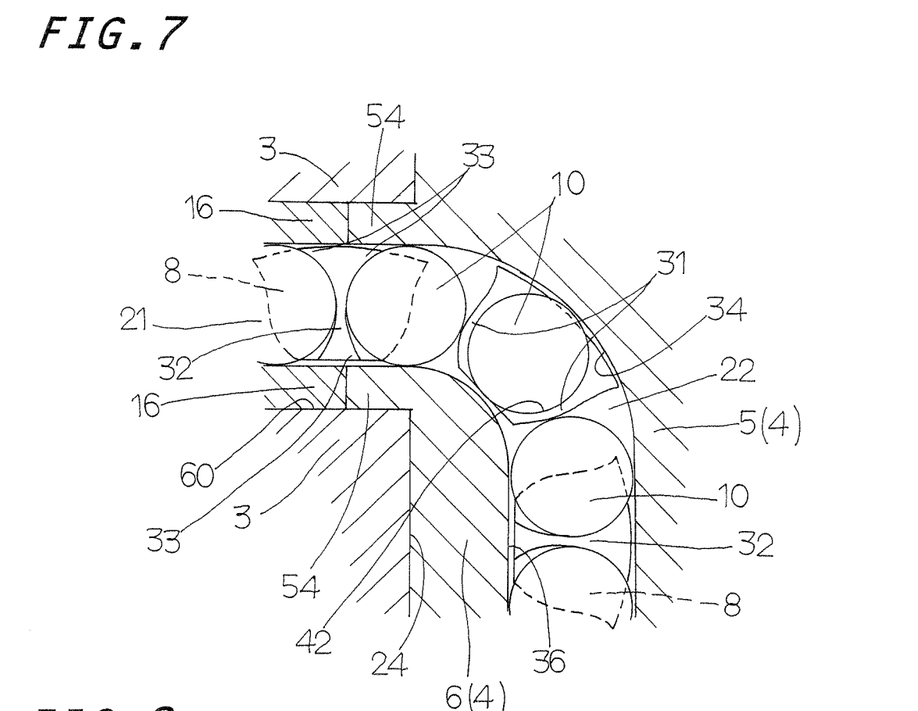
FIG. 7 is an enlarged fragmentary view in section showing the rollers in a recirculation circuit of FIG. 6, in which the rollers transfer from a return passage of a sleeve to a turnaround passage in an end cap.

Referring to FIGS. 3 to 7, there are shown how the rollers 10 together with the separators 8 make back-and-forth movement in the recirculation circuit 23. FIG. 3 shows entirely the back-and-forth movement of the rollers 10 together with the separators 8 through the recirculation circuit 23. In FIG. 4, there is shown an enlarged fragmentary view to illustrate how the rollers 10 together with the separators 8 lying on the upside load-carrying race 20 are held with the retainer plate 50. Moreover, the retainer plate 50 has the window 58 extending lengthwise on each side of the retainer plate 50. The window 58 is partly restricted with the first extensions 51 and the second extensions 52 extending from widthwise opposite edges of the window 58 across the load-carrying race 20 on the carriage 3 to overhang a little above the load-carrying race 12, so that the grooves 59 lying across the load-carrying race 20 in opposition to each other are each defined between any one of the first and second extensions 51, 52 and the load-carrying race 12. The first projection 27 and second projection 28 made on the separator 8 fit loosely into the grooves 59 to guide or lead the separator 8 along with the rollers 10 along the grooves 59 back and forth through the recirculation circuit 23. In FIG. 5, there is shown a geometric relation between the separators 8 and the rollers 10 while moving back and forth on the load-carrying race 20 in the linear motion guide unit. The rollers 10 moving through the load-carrying race 20 are spaced away equally from each other with the separators 8 to keep a preselected pitch P between the successive rollers 10. The separator 8 and the bilaterally turned-over separator 8 are arranged alternately in series with keeping a preselected pitch 1.5 P (refer to FIG. 17) between the successive separators 8. In FIG. 6, there is shown a geometric relation between the separators 8 and the rollers 10 while transferring from the turnaround passage 22 into the return passage 21, and vice versa. In FIG. 7, there is shown a geometric relation between the separators 8 and the rollers 10 while transferring from the turnaround passage 22 into the return passage 21, but about 45° later than the relation shown in FIG. 6. With the separator 8, the first separator wing 31 has an outside convex surface 44 which is adapted to make smooth contact with the circular rolling surface 39 of the roller 10 to help the roller 10 roll through the turnaround passage 22 in the circulation circuit 23 as shown in FIG. 7.

Figure 18:
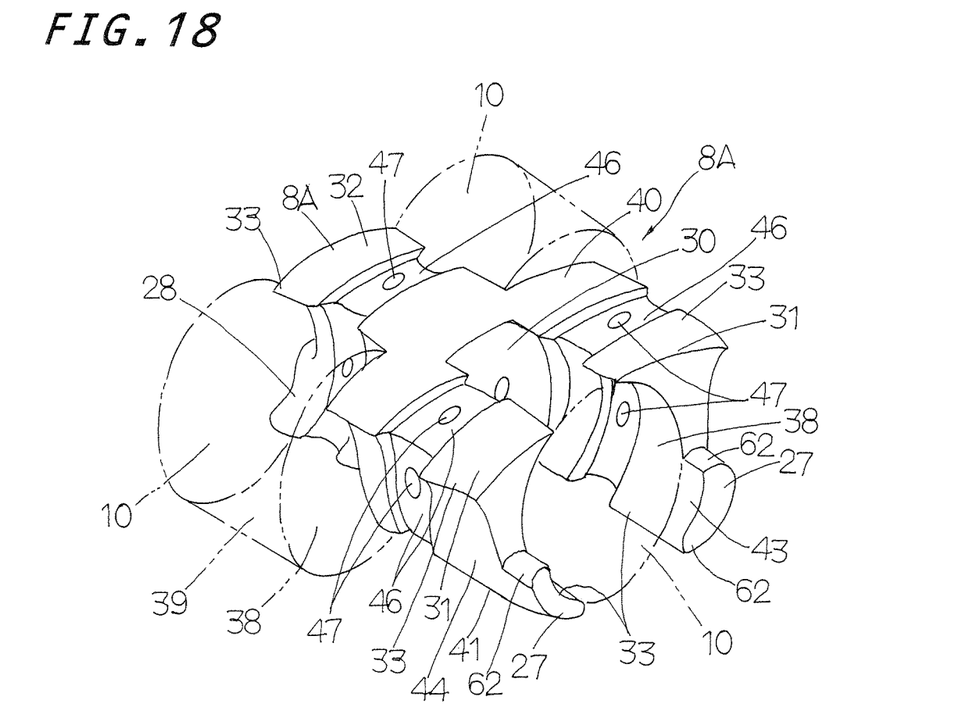
FIG. 18 is a view in perspective showing another version of the separator combined with the rollers in the linear motion guide unit of FIG. 1.
Figure 19:
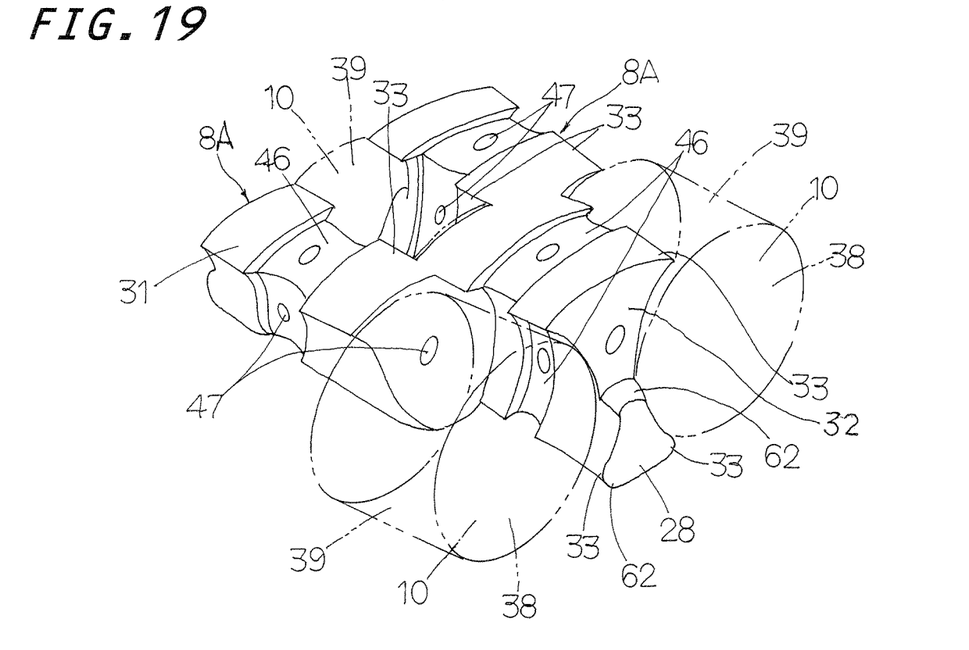
FIG. 19 is a view in perspective of the separator when observed from the side opposite to FIG. 18.
Figure 20:
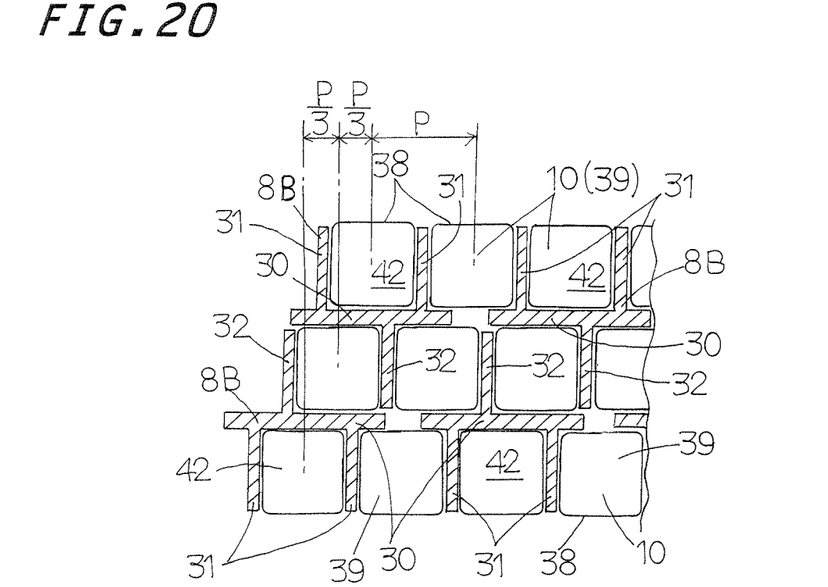
FIG. 20 is a schematic view of the separators arranged for the three roller rows installed in one recirculation circuit of the linear motion guide unit.
Figure 21:
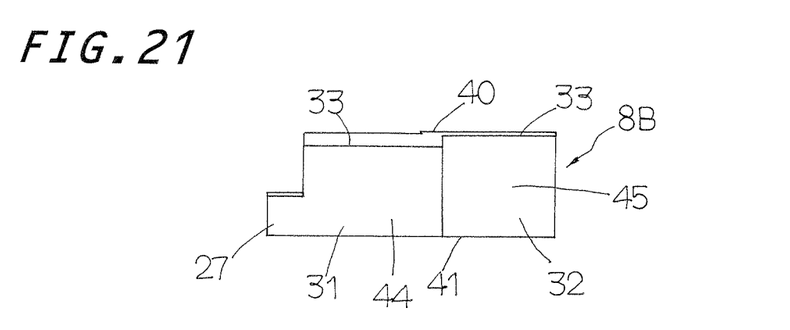
FIG. 21 is a view in front elevation of the separator of FIG. 20, but viewed in the direction along the recirculation circuit in the linear motion guide unit.
Figure 22:
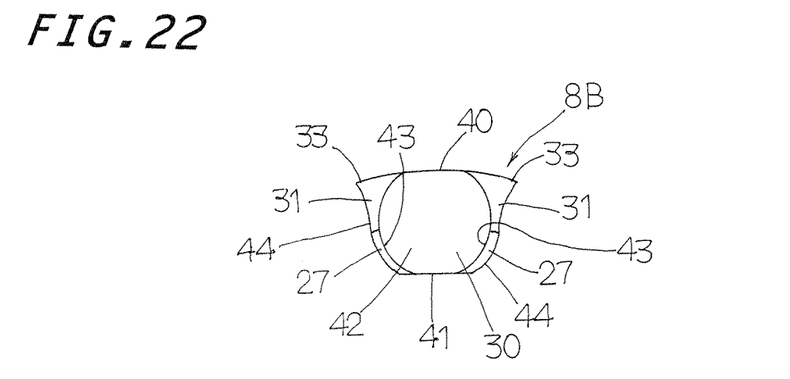
FIG. 22 is a view in leftward side elevation of the separator of FIG. 21.
Figure 23:
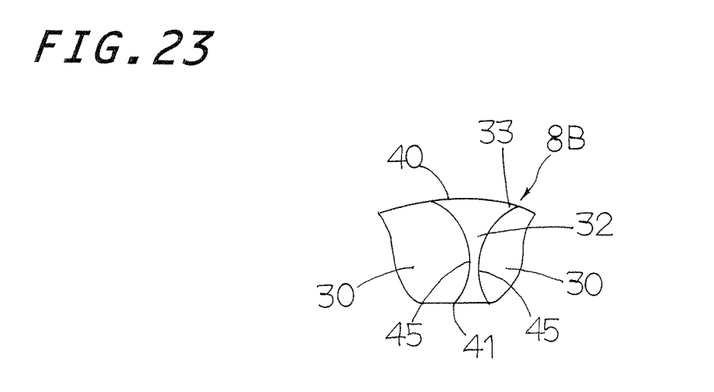
FIG. 23 is a view in rightward side elevation of the separator of FIG. 21.
Figure 24:
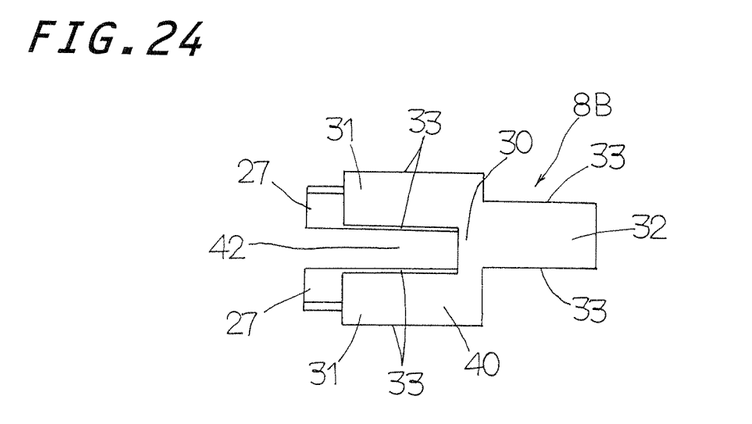
FIG. 24 is a view in top plan of the separator of FIG. 21.
Figure 25:
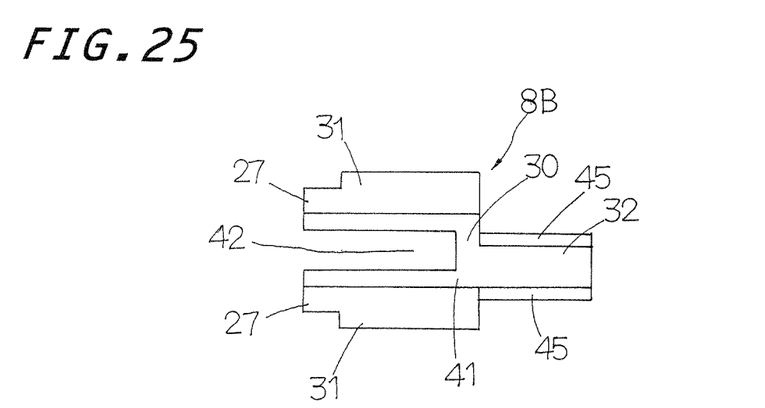
FIG. 25 is a view in bottom plan of the separator of FIG. 21.

Next, referring to FIGS. 18 and 19, there is shown another version of the linear motion guide unit of the present invention. A modified separator 8A has grooves 46, caves or recesses 47 serving oil reservoirs or sumps, which are made on surfaces coming into contact or engagement with the circular rolling surface 39 and/or axially opposite ends 38 of the rollers 10. The grooves 46, caves or recesses 47 are preferably made on preselected locations, for example surfaces which would be expected to make direct contact with the rollers 10. Most of the components of the separator 8A are the same as previously described other than the grooves 46, caves or recesses 47 as stated just above. To that extent, the components have been given the same reference characters, so that the previous description will be applicable.

Moreover, a further another version of the linear motion guide unit of the present invention will be described later with reference to FIGS. 20 to 25. With a further another version of the linear motion guide unit, a separator 8B is adapted to a construction in which three rows of the rollers 10 are arranged on only a circulation circuit 23. On the separator 8B, three roller rows are arranged out of phase by P/3 from each other in the longitudinal direction of the roller rows. With the separator 8B, the first separator wing 31 and the second separator wing 32 are arranged on the isolation wall 30 out of phase by P/3 with each other. More particularly, whereas the separator 8 has the second separator wing 32 lying midway between the adjacent first separator wings 31, the separator 8B has the second separator wing 32 lying out of phase by P/3 from each other. With the roller row on either side of the three roller rows, the first separator wings 31 are provided to embrace the roller 10 between any two adjacent first separator wings 31. With the roller row in the middle of the three roller rows, the roller 10 is flanked with the second separator wings 32 of the separator 8B. More especially, the rollers 10 on either side of the three roller rows lying on the circulating circuit 23 are each embraced between any two adjacent first separator wings 31, and the rollers 10 in the middle of the three roller rows are isolated from each other with the second separator wings 32. Most of the components of the separator 8B are the same as previously described other than the geometric relation between the first separator wings 31 and the second separator wings 32 as stated just above. To that extent, the components have been given the same reference characters, so that the previous description will be applicable.

What is claimed is:

1. A linear motion guide unit comprising;

an elongated guide rail having a first raceway surface extending lengthwise on each side of the guide rail, and a slider having a second raceway surface extending in opposition to the first raceway surface on the guide rail to define a load-carrying race between the first raceway surface and the second raceway surface, the slider that fits over or conforms to the elongated rail for movement in a sliding manner relative to the guide rail through a roller rolling through the load-carrying race, and the slider including a carriage having a return passage extending in parallel with the second raceway surface, and end caps secured on lengthwise opposite ends of the carriage and provided with turnaround passages to communicate the load-carrying race with the return passage to provide only a closed or looped circuit;

wherein a plurality of roller rows are arranged on the closed or looped circuit and a separator is interposed between any two rollers to roll together with the rollers through the closed or looped circuit which is made up of the load-carrying race, the return passage and the turnaround passages; and wherein the separator is composed of an isolation wall lying between any two adjacent roller rows to come into sliding contact with axially opposite ends of the rollers juxtaposed each other in the two adjacent roller rows to guide or lead the rollers, first separator wings extending from the isolation wall in a sidewise direction to embrace on both sides of a circular rolling surface of the roller in one row of the two adjacent roller rows, and a-second separator wings extending from the isolation wall in a sidewise direction opposite to the sidewise direction to lie between circular rolling surfaces of the rollers in another row of the two adjacent roller rows.

2. The linear motion guide unit constructed as defined in claim 1, wherein the plurality of roller rows is N rows, in which N is a number more than two, and the rollers in the adjacent roller rows roll in a lengthwise direction of the roller row while maintaining a phase difference by 1/N pitch relative to each other.

3. The linear motion guide unit constructed as defined in claim 1, wherein the plurality of roller rows is two rows, and the separators are alternately bilaterally turned over and arranged between the roller rows along a traveling direction of the rollers.

4. The linear motion guide unit constructed as defined in claim 1, wherein the plurality of roller rows is three rows, and the separators are arranged such that the first separator wings are each interposed between the adjoining rollers rolling through the roller row lying at either side of the three roller rows and the second separator wings are each interposed between the adjoining rollers rolling through a middle row of the three roller rows.

5. The linear motion guide unit constructed as defined in claim 1, wherein the pair of first separator wings has inward curved surfaces opposing each other to embrace the circular rolling surface of the roller and second separator on both sides thereof has inward curved surfaces each of which comes into contact with the circular rolling surface of the roller.

6. The linear motion guide unit constructed as defined in claim 1, wherein the separator has an inner surface of flat contour in conformity with an inner surface of the turnaround passage in the closed or looped circuit, and an outer surface of curved contour in conformity with an outer surface of the turnaround passage in the closed or looped circuit.

7. The linear motion guide unit constructed as defined in claim 1, wherein the first separator wings and the second separator wings at their free ends have flanges to embrace the circular rolling surface of the roller to serve for keeping the roller against falling away from the slider while rolling through the load-carrying race.

8. The linear motion guide unit constructed as defined in claim 1, wherein the first separator wings and the second separator wings at their ends have a first projection and a second projection respectively, each of which fit in a guide groove cut in the closed or looped circuit.

9. The linear motion guide unit constructed as defined in claim 8, wherein a retainer plate fits in a recess cut in the carriage midway between an upside load-carrying race and a downside load-carrying race and further the first projection of the first separator wings and the second projection of the second separator wings are held for movement with s-first extensions, a-second extensions and s-third extensions in cooperation with the carriage.

10. The linear motion guide unit constructed as defined in claim 8, wherein the first projection and the second projection to lead the separator along the closed or looped circuit have edges that are beveled or rounded to have a curved configuration.

11. The linear motion guide unit constructed as defined in claim 1, wherein the separator has grooves, caves or recesses serving oil reservoirs or sumps, which are formed on surfaces coming into contact or engagement with the circular rolling surface and/or axially opposite ends of the roller.

\* \* \* \* \*